US008949273B2

(12) United States Patent
Main

(10) Patent No.: US 8,949,273 B2
(45) Date of Patent: Feb. 3, 2015

(54) ONLINE CUSTOMER SUPPORT SYSTEM

(75) Inventor: Alexander M. Main, Columbus, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 2763 days.

(21) Appl. No.: 11/210,991

(22) Filed: Aug. 24, 2005

(65) Prior Publication Data

US 2007/0055668 A1 Mar. 8, 2007

(51) Int. Cl.
*G06F 17/30* (2006.01)

(52) U.S. Cl.
CPC ............................... *G06F 17/30867* (2013.01)
USPC ............................. 707/781; 707/783; 707/784

(58) Field of Classification Search
USPC ............. 705/7; 707/10, 102, 1, 9, 104.1, 201, 707/783, 784, 785
See application file for complete search history.

(56) References Cited

U.S. PATENT DOCUMENTS

| 6,513,039 | B1 * | 1/2003 | Kraenzel ........................ 707/784 |
| 6,668,327 | B1 * | 12/2003 | Prabandham et al. ............ 726/4 |
| 7,031,962 | B2 * | 4/2006 | Moses ........................... 707/783 |
| 7,774,365 | B2 * | 8/2010 | Oxenstierna et al. ......... 707/783 |
| 7,870,156 | B2 * | 1/2011 | Rutter et al. ................... 707/783 |
| 2004/0044895 | A1 * | 3/2004 | Reasons et al. ................ 713/182 |
| 2004/0186809 | A1 * | 9/2004 | Schlesinger et al. ............ 705/50 |
| 2005/0234735 | A1 * | 10/2005 | Williams ......................... 705/1 |
| 2006/0015754 | A1 * | 1/2006 | Drehmel et al. ............... 713/193 |
| 2006/0059340 | A1 * | 3/2006 | Eldenmalm et al. .......... 713/168 |
| 2006/0282392 | A1 * | 12/2006 | Ewert et al. ..................... 705/59 |
| 2007/0014443 | A1 * | 1/2007 | Russo ........................... 382/124 |

* cited by examiner

*Primary Examiner* — Christyann Pulliam
*Assistant Examiner* — Rezwanul Mahmood
(74) *Attorney, Agent, or Firm* — Carlson, Gaskey & Olds

(57) ABSTRACT

An online customer support system (20) automates access for a user to a variety of types of information (24-31) maintained within a database (22). In a disclosed example, a dynamic user profile management module (50) automatically establishes a user profile including entitlements to sets of information within the database (22) each time a user accesses the system. A disclosed entitlement inference module (54) recognizes explicit entitlements based on accessibility indicators or infers entitlements based on various disclosed factors or relationships. A disclosed linking module (52) automatically determines a probability that a user can be granted another entitlement that was not granted by the entitlement inference module (54). An example process of registering a user includes requiring only a single piece of information from the user to automatically establish access for that user to an associated portion of the database (22) and any other portions of the database (22) that user should be able to access.

20 Claims, 2 Drawing Sheets

ONLINE CUSTOMER SUPPORT SYSTEM

FIELD OF THE INVENTION

This invention generally relates to providing online information to a plurality of users. More particularly, this invention relates to managing information and dynamically managing user access to information for an online support system.

DESCRIPTION OF THE RELATED ART

With the proliferation of computers and the Internet, businesses are constantly striving to provide improved customer services. Companies are increasingly providing websites with various content regarding the company and its products or services to increase awareness of the same. Additionally, companies are increasingly attempting to provide useful online content to customers or potential customers to increase customer satisfaction and loyalty.

One advancement in this regard is to provide online customer support services. Examples of such arrangements provide individuals with online access to information regarding account status, shipment tracking, product details and specifications, warranties and service agreements and technical support information. Some such systems include the ability for an individual to obtain information using a "live chat" format for addressing specific questions.

The more complex an organization and the wider variety of products or services offered by it, the greater the challenge in providing a satisfying online customer experience. For example, some companies offer a wide variety of products, services or both. Different divisions of the company may be responsible for each type of product or service. Each of the divisions typically maintains its own website to provide customers with information of various forms. An individual seeking information regarding more than one of the products or services may need to separately access the websites of the corresponding divisions to acquire the desired information. Moreover, each website may require a separate log on by the user, which may include a relatively tedious registration process for initial access to the online information.

There is a need for an improved arrangement that would allow an individual to gain information from each division of a company, for example, utilizing a single website access point. There are various challenges in attempting to provide such a "one stop shopping" experience for a customer seeking online customer support information.

One challenge is how to authenticate users (typically through acceptance and validation of a "user id" and "password") and share that authentication across many websites (commonly referred to as single-sign-on). Various proposals have been made for providing single-sign-on capability, which will not be discussed in this document. Another challenge is the determination of the type and nature of information visible to the user once the user has been identified (has logged on).

One challenge is how to maintain the information and to control access to it as may be necessary. Another challenge is how to manage changes to the available information made by any one of the contributors to the information, assuming that various sources provide new or updated information for eventual customer use. There are additional hurdles presented by facilitating easy customer access to as much information as possible to avoid potential frustration by an individual seeking various types of information.

SUMMARY OF THE INVENTION

This invention provides a unique approach to managing customer access to online customer support information.

An exemplary disclosed embodiment provides a customer with automated access to information available to the customer from an online customer support system in an automated fashion that greatly reduces the burden on the individual customer seeking such information. Additionally, the disclosed example significantly reduces the burden on a provider of the information and automates processes for keeping user entitlements updated.

An exemplary method of providing online customer support includes providing a database containing a plurality of sets of information. The method includes automatically establishing a user profile that includes at least one entitlement to at least one of the sets of information responsive to receiving an identification of a user.

In one example, each time that a user logs on to a system, the system dynamically and automatically creates a user profile for that session that includes entitlements to appropriate portions of the database for that user.

One example includes using accessibility indicators associated with sets of information for determining explicitly recognizable links between the user identification and the accessibility indicators. Such links establish explicitly recognizable entitlements in one example.

Another example includes inferring entitlements on behalf of a user based upon information such as an association between portions of the database, a relationships between accessibility indicators or relationships between user identifications. In one example, inferred entitlements result from such relationships even though an entitlement cannot be explicitly recognized from a direct relationship between an accessibility indicator and the user identification.

In one example, a user is able to register their identification for access to the database by providing limited information. This greatly simplifies the user's task when registering. In one example, providing a contract number or product serial number allows for automatically determining entitlements to the corresponding sets of online support information available to that user. Additionally, a disclosed example includes automatically linking that user's identification with any other set of information within the database to which that user should have access based upon entitlements to each such set of information. Streamlining a registration process and automatically linking as many available sets of information with a registered user as possible greatly enhances a customer's experience when seeking online customer support information.

The various features and advantages of this invention will become apparent to those skilled in the art from the following detailed description. The drawings that accompany the detailed description can be briefly described as follows.

DETAILED DESCRIPTION

This invention provides online customer support information in an enhanced manner that reduces the burden on customers, streamlines registration and access procedures and provides a single point of contact for all available information to which a customer is entitled access based upon selected criteria.

Figure 1:
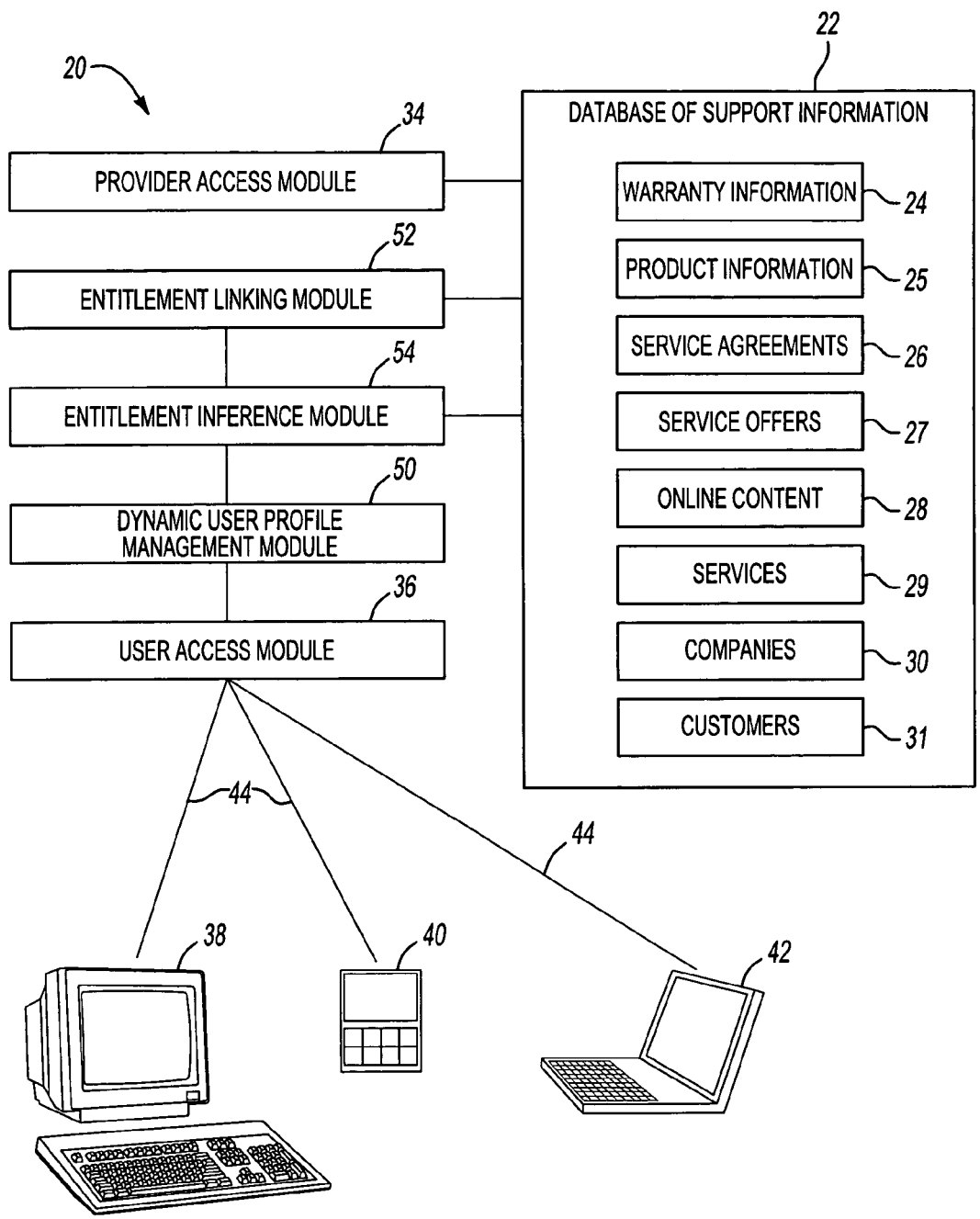
FIG. 1 schematically shows an online customer support system designed according to an embodiment of this invention.

FIG. 1 schematically shows an online customer support system 20 that includes a database 22 of online support information. The database 22 in this example includes a plurality of sets of online support information. In the illustrated example, warranty information is provided in a set 24, product detail information is provided in a set 25, service agreement information is provided in a set 26, service offer information is provided in a set 27, online content information is in a set 28 and service information such as technical support information is provided in a set 29. The illustrated example also includes a company information set 30 and a customer information set 31. Each of the schematically shown sets may include a plurality of subsets or a plurality of distinct portions of information. For example, the warranty set 24 may include information regarding a large number of different warranties regarding different products. The services set 29 may provide different sets of technical information regarding different products or service contracts.

In one example, the database 22 includes information regarding products and services offered by a wireless communications company that provides various wireless communication services and products through various divisions of the organization. In another example, the database 22 provides online customer support information for an organization that offers financial products and services such as investment accounts, banking accounts, life insurance and related products or services. Given this description, those skilled in the art will realize what types of information may be included in a database like the example database 22 to realize the benefits provided by the disclosed example embodiment.

The illustrated example includes a provider access module 34 that facilitates a provider (or a plurality of providers) of information establishing, maintaining and updating the database 22. In this example, the provider access module 34 facilitates a provider of the database 22 maintaining the sets of data including associating an accessibility indicator with a subset of information such that access to the information is limited to appropriate users with an entitlement or status corresponding to the accessibility indicator. The accessibility indicator provides an indication of which users or categories of users will have access to the associated information (e.g., other individual records or subsets within a set of information). For example, selected information within the product information set 25 may be limited to customers who purchase a particular product as evidenced in the warranty set 24. In this case, an accessibility indicator established by the provider of the warranty information is associated with some of the information in the database 22.

Another feature of the example database 22 is the there are relationships or associations between portions of at least some of the sets of information. In one example database, a subset of data within the warranty set 24 is associated with a subset of data in the product information set 25. In the same database, a subset of data within the product information set 25 is associated with a subset of data within the service agreement set 26. In the same example database, a subset of data from the online content set 28 is associated with a subset of data from the service offer set 27. At the same time, a subset of information from the service offer set 27 is associated with a subset of data from the service agreement set 26. A subset of data from the customers set 31 is associated with a subset of data from the company set 30. In the same example, a subset of data from the company set 30 is associated with a subset of data from the service agreement set 26.

These type of associations are useful in several ways to provide access to users or customers to as much information as possible while imposing minimal burden on the customers or providers of the information.

A user access module 36 facilitates access to the information within the database 22 by a plurality of customers or users of the system 20. In the illustrated example, any one of a plurality of user access devices such as a personal computer 38, a personal digital assistant 40 or a notebook computer 42 allow an individual to obtain access to the desired information. Such devices include a display as known. The user access module 36 presents a user with a visible indication on such a display that shows a user what types of information that user can access. The user access module 36 in one example facilitates at least one of internet or intranet based access to the information in the database 22.

The communication links schematically shown at 44 in the illustration represent line based or wireless communication links that operate in a known manner to facilitate information exchange between the customers and the system 20.

One example embodiment includes minimizing the amount of information required from a new customer attempting to access the database 22. If the customer is attempting to access information regarding a service agreement or to register themself as a new customer who has obtained a service agreement, the user access module 36 can automate the registration process after receiving as little as one piece of information from the customer.

Example pieces of information include a contract identifier, a product identifier, product serial number or any combination of such information. In this example, the provider of the service agreement enters information into the database 22 using the provider access module 34, which associates an accessibility indicator with the contract, the product identification or both. The user access module 36 determines whether the information entered by the customer desiring access to the system (i.e., product identifier) corresponds to information within the database 22. If there is an appropriate match, the user is automatically registered and provided with access to the associated information.

In one example, the provider uses the provider access module 34 to enter information into the system regarding a user associated with a contract number, for example. When a user subsequently enters the contract number during the registration process, the user is automatically entitled to corresponding information provided by that provider. In another example, when a user enters a product during the registration process, the corresponding contract is located based on the customer's identity and the contract coverage for the specified product. The user is automatically entitled to corresponding information provided by that provider. In either case, the user's registration is greatly streamlined by automating the registration process responsive to input of as little as a single piece of information from the user.

In one example, the registration process takes advantage of relationships between different portions of the database 22 during the registration process.

During one example registration process, a customer provides a product identification that enables the system 20 to determine that the customer is entitled to access to the warranty information associated with that product based upon the customer-supplied information and consideration of all the associated accessibility indicators from the provider contained within the database 22, for example. In other words, accessibility indicators associated with each of the subsets of data that are associated in some manner as described above can be used for determining whether the customer attempting registration is entitled to access product or warranty information, for example, associated with the product identifier provided by the customer.

A significant advantage of the illustrated example is that once registered, a user not only has access to the information in the database 22 corresponding to the specific product or contract number entered by the user, but also automatically achieves access to information within any one of the sets of information in the database 22 to which that user should be granted access.

Another significant advantage of the illustrated example is that once registered, a user will be granted additional access in the future indirectly as the accessibility indicators within the sets or associations between the sets are modified as might happen when new or changed policies, information, processes or business relationships are introduced.

The illustrated example includes a dynamic user profile management module 50 that controls access to the various sets of information for a user. In one example, the dynamic user profile management module 50 automatically determines entitlements of a user each time the user logs on to the system based on information obtained from an entitlement inference module 54. The illustrated example does not maintain a user profile in a traditional sense that is used from session to session of accessing the system. Instead, this example dynamically creates a user profile regarding entitlements of the user to the various sets of information in the database 22 each time that the user logs on to or accesses the system.

In one example, the entitlement inference module 54 utilizes one or more known searching techniques for searching through the database 22 to identify accessibility indicators that correspond to an entitlement for a particular user. For example, a customer identification provided through the user access module 36 may have a preestablished entitlement status that the entitlement inference module 54 recognizes and associates with existing accessibility indicators that have a corresponding relationship to the entitlement status. For example, a customer may be a member of an organization that indicates which types of information should be available to that user. Another example entitlement status is based upon a subscription rate paid by the user. In another example, the entitlement status indicates that the user is an employee of a particular company. Accessibility indicators for at least some sets of information may indicate that all employees of a particular company should be granted entitlement to that set of information. The example entitlement inference module 54 utilizes a variety of such relationships that are based upon recognizing one or more features of the user status and one or more features of an accessibility indicator such that appropriate entitlements are provided through the dynamic user profile management module 50.

The entitlement inference module 54 is capable of determining additional entitlements for a user beyond those that can be explicitly recognized. For example, a provider of information for the database 22 may update some of their information including a new accessibility indicator that grants a particular user access to that information. Other portions of the same provider's information may not include an updated accessibility indicator. The entitlement inference module 54 in one example recognizes other similarities between the sets of information for inferring when the accessibility indicator of both could be the same to provide a user with an entitlement to both sets of information, rather than just to the one having the explicitly recognized accessibility indicator.

The entitlement inference module 54 in another example infers entitlement based upon relationships between sets of information within the database and information regarding a user's entitlement to at least one of such sets. For example, a user may have an explicitly recognized entitlement to a subset within the warranty set 24. That same subset has an association with a subset of information in the service agreement set 26. That subset has associations with multiple subsets in the product set 25. These associations are utilized by the entitlement inference module 54 to infer entitlement to all of the associated subsets just mentioned. If selected criteria are satisfied, the user gains access to all such subsets even though the only explicit entitlement (based on an accessibility indicator, for example) for that user would result in entitlement to access the information in the warranty set 24.

The entitlement inference module 54 provides a more dynamic and more flexible entitlement granting feature that provides a user with an even more expansive range of entitlement. Additionally, the ability to infer entitlements lessens the burden of providers of information so that they do not have to explicitly update all sets of information in the database 22 with respect to a single user each time a change to one or more sets is made.

Moreover, the entitlement inference module 54 automates the process of managing entitlements without requiring the provider of the information to update individual customer or user profiles. Instead, the provider of the information can merely insert the new information or new accessibility indicator into the database 22. The entitlement inference module 54 then automatically determines how the accessibility indicator associated with that new information indicates any relationship with previously existing accessibility indicators or entitlements, for example, and the dynamic user profile management module 50 automatically provides updated entitlements the next time that the user logs on to or accesses the system.

In one example, portions of the database 22 can be selectively marked by a provider of the information such that an entitlement inference module cannot infer relationships that are not explicitly stated by the provider. For example, an explicit subscription status may be required before a user will be entitled to particular information. Other providers may streamline providing accessibility indicators by designating or arranging their information for allowing an entitlement inference module to infer entitlements to most or all of their information for any user having an explicitly recognized entitlement to at least one such set of information.

The illustrated example includes an entitlement linking module 52 that may update accessibility indicators or other information in the database 22 in order to make an inferred entitlement explicit. In one example, the linking module 52 determines which implicit entitlements may need to be made explicit each time a new user registers or requests access to new information, for example.

In one example, an individual user may request access to some information from the database 22 that does not appear available based upon the user's dynamically assigned entitlements. Under such circumstances, the entitlement linking module 52, determines whether the database 22 includes information sufficient to warrant giving that user access to the requested information (i.e., whether there is an existing entitlement to that information for that user). The result of that determination is a probabilistic answer regarding the likelihood that the user should be granted that entitlement. If the answer can be determined with a high degree of probability that the user is not entitled (as in the case where a service agreement already has expired), the user can be informed immediately that the request for additional entitlement has been denied. One example includes providing an indication of the reasons for the denial.

If the answer can be determined with a reasonable certainty (in one example, 99%) that the user should be entitled, then the example linking module 52 creates at least one explicit accessibility indicator within the database 22 to bring the certainty to 100%. Alternatively, the entitlement inference module 54 can be set to the same level of certainty without any updates to the database 22 so as to create a virtual approval.

In one example, if the probability regarding the likelihood of entitlement is within a selected range from possible to probable, the dynamic user profile management module 50 communicates with the provider access module 34 in a manner that prompts a responsible individual to investigate the customer's request for the additional access. That individual can check for missing records regarding recent purchases, for example, employment status of the user or other relevant information to determine whether the desired access should be granted. If so, that individual may use the provider access module 34 to update an accessibility indicator in the correct set of online support information within the database 22 such that the entitlement inference module will make the appropriate association for updating the dynamic user profile module 50 at the next user session, or optionally during any current user session.

If the individual using the provider access module 34 determines that the user is not entitled to the desired information, the provider access module 34 in one example facilitates sending an appropriate notification to the user by email or through the user access module 36, for example. The notification may include further instructions or an explanation for why the requested access was denied.

One way of expressing the difference in the operation between the example entitlement linking module 52 and the example entitlement inference module 54 is that the entitlement inference module 54 recognizes explicit and implicit accessibility for use by the dynamic user profile management module 50. The linking module 52 creates or updates accessibility indicators or modifies other records within the database 22 to make explicit some otherwise implicit entitlement, or to increase the probability of entitlement to beyond a threshold necessary for the entitlement inference module to recognize implicit access. In one example, a user requests access to an entitlement that has not been explicitly or implicitly granted. The user may be a member of two different communities of which 90% of users who are also members of the same two communities would have access to the requested entitlement. If the threshold for implicit entitlement is at 95%, the linking module 52 would determine that entitlement was likely, but not above the threshold and communicate with the provider access module 34 in such a manner that a provider would be prompted to make the decision as to whether the user should be granted the requested access.

It should be noted that the various modules schematically shown in the illustration are delineated in this manner for discussion purposes. The described functions of one or more of the modules may be combined into fewer or separated into even more modules to meet the needs of a particular situation. For example, the modules 52 and 54 may be part of the module 50. Given this description, those skilled in the art will be able to develop appropriate software code and to use appropriate processing techniques to achieve the results provided by the disclosed example in a manner that suits their particular needs.

Figure 2:
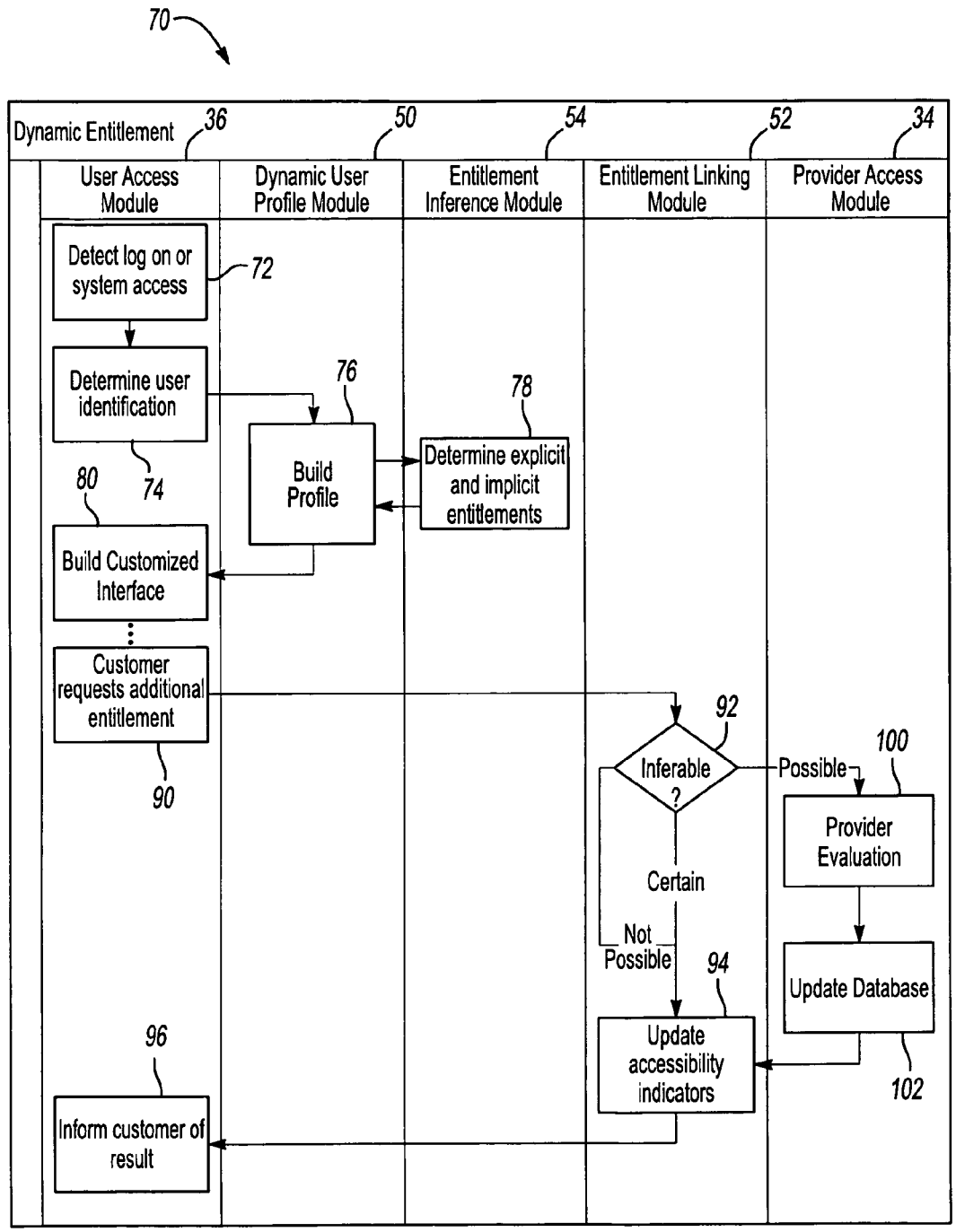
FIG. 2 is a flow chart diagram summarizing an approach in one example embodiment of this invention.

FIG. 2 includes a flowchart diagram 70 that summarizes an example approach for granting a user entitlements to appropriate portions of the database 22. At 72, the user access module 36 detects a log on or attempted access by a user. At 74, the user is identified. At 76, the user identification provides information for linking any accessibility indicators with that user identification for establishing entitlements within the user profile for that session. At 78, entitlements are inferred based upon relationships between current entitlements for that user and other accessibility indicators within the database, for example. Entitlements may be inferred based upon one or more characteristics of the user's identification and known entitlements for similarly situated users. The resulting approved entitlements are included in the profile at 76. Once established, the profile is used to control an interface shown to the customer at 80.

One example includes automatically performing the steps schematically shown at 72 through 80 in FIG. 2 each time that a user logs on to or accesses the system. There is no need to maintain a static user profile that is carried over from one session to another with the example approach.

The example of FIG. 2 also summarizes an approach for modifying the user profile if the customer requests an additional entitlement that is not part of the customized interface provided at 80. In FIG. 2, at 90, the customer requests an additional entitlement that has not been granted by the entitlement inference module 54. At 92, the entitlement linking module 52 considers information regarding the existing user profile and information regarding the data to which the customer requires access. If there is a sufficiently reliable relationship between the types of information or between the customer and other users who have access to the requested information, for example, the entitlement linking module 52 updates at least one accessibility indicator at 94 to indicate the additional entitlement. The user access module 36 then provides an indication to the customer at 96 regarding the granted additional entitlement.

Within FIG. 2, it is also possible for the entitlement linking module 52 to determine that the additionally requested entitlement cannot be inferred at 92. This result can then be communicated to the user at 96 and may include, for example, an indication of the reason for denying the additional entitlement.

Under some circumstances, the entitlement linking module 52 will determine that an entitlement to the additionally requested information is possible but not certain enough to be automatically granted. At 100, the provider access module 34 receives a communication from the entitlement linking module 52 to prompt a responsible individual to make a determination whether the requested access can be granted. At 102, the appropriate individual either grants the additional entitlement or denies the request. The accessibility indicators are then updated at 94 accordingly and the result is communicated to the customer at 96. As can be appreciated from the above description, it is not necessary to carry out the steps schematically shown at 90 through 102 in FIG. 2 during each session for a user, but rather only when entitlement is requested to access information beyond that determined to be available for that user by the entitlement inference module 54.

The disclosed example provides enhanced user access to a potentially wide variety of information within a database containing online customer support information that may come from a variety of sources. The disclosed example provides a user with an enhanced online customer support experience compared to previous arrangements where additional information was required from a user repeatedly, the user was required to attempt to access various websites or both. The disclosed example provides a single source and single access point to a user that reduces any burden on the user and the provider of information for automating access to as much information as appropriate each time a user logs on to the system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of providing online customer support, comprising the steps of:
   (A) providing a database containing a plurality of sets of information;
   (B) automatically establishing a user profile that includes at least one entitlement to at least a portion of one of the sets of information responsive to receiving an identification of and
   (C) determining a probability that the user can have the entitlement by determining whether the database includes information sufficient to warrant giving the user the entitlement.

2. The method of claim 1, comprising
inferring at least one entitlement based upon at least one of an accessibility indicator that indicates at least one user is entitled to access corresponding information, a relationship between two accessibility indicators, a relationship between two entitlements, an association between portions of the database or a relationship between user identifications; and
automatically granting the user any resulting inferred entitlement.

3. The method of claim 1, wherein step (A) includes associating an accessibility indicator with at least one selected portion of the sets of information, each accessibility indicator indicates acceptable access to corresponding information and step (B) includes determining which of the accessibility indicators expressly indicate an entitlement for the user to have access to the corresponding information.

4. The method of claim 3, wherein step (B) comprises searching the database for locating accessibility indicators corresponding to the user identification and automatically including an entitlement to any portion of any of the sets of information corresponding to any of the located accessibility indicators.

5. The method of claim 3, wherein the accessibility indicator indicates at least one of a plurality of user identifications or at least one category of user identification to whom entitlement should be granted.

6. The method of claim 1, comprising
determining that the user desires an additional entitlement;
determining a probability that the user can have the additional entitlement; and
automatically providing the additional entitlement in the user profile if the determined probability indicates that the user can have the additional entitlement.

7. The method of claim 6, comprising prompting an individual to decide if the user can be granted the additional entitlement if the determined probability indicates that the user might be able to have the additional entitlement within a selected degree of certainty.

8. The method of claim 6, comprising automatically creating an explicit entitlement if the determined probability is within a selected range.

9. The method of claim 1, comprising using the established user profile for only one session for the user.

10. The method of claim 1, comprising registering the user by:
    receiving the user identification from the user;
    receiving an indication from the user regarding at least one portion of at least one of the sets information; and
    determining whether the received user identification has an expected relationship with the at least one portion of the at least one set of information.

11. The method of claim 10, comprising completing registering the user before automatically establishing the user profile.

12. The method of claim 10, wherein the received indication from the user is related to a set of information to which the user desires access but for which the user does not have entitlement and comprising automatically granting the user entitlement to the new set of information with any entitlements already part of the user profile.

13. The method of claim 1, wherein step (B) includes determining whether the user has a status corresponding to entitlement to at least a portion of one of the plurality of sets of online support information.

14. An online customer support system comprising:
    a database including a plurality of sets of information having associated accessibility indicators that indicate whether a user is entitled to access to the associated information; and
    a processing machine including a dynamic user profile management module that automatically creates a user profile including at least one entitlement to at least a portion of one of the sets of information responsive to receiving an identification of a user and based upon one of an explicit indication of the entitlement or an inferred entitlement, the processing machine including an entitlement linking module that automatically determines a probability that the user can be granted the entitlement based upon a determination whether the database includes information sufficient to warrant giving the user the entitlement.

15. The system of claim 14, comprising an entitlement linking module that automatically determines a probability that a user can be granted an entitlement to a portion of the database if an explicit or inferred entitlement does not already exist.

16. The system of claim 14, wherein the entitlement linking module automatically provides an indication to prompt an individual to determine whether the entitlement can be granted if the determined probability is within a selected range.

17. The system of claim 14, comprising an entitlement inference module that automatically infers at least one entitlement to at least a portion of one of the sets of information for the user.

18. The system of claim 17, wherein the entitlement inference module infers an entitlement based upon at least one of an accessibility indicator that indicates at least one user is entitled to access corresponding information, a relationship between two accessibility indicators, a relationship between two entitlements, an association between portions of the database or a relationship between user identifications.

19. The system of claim 14, comprising an access module that facilitates registering a user responsive to receiving a single indication from the user regarding an item of information within the database.

20. The system of claim 14, wherein the dynamic user profile management module uses the created user profile for only one session where the user accesses the system.

\* \* \* \* \*